Figure 1:
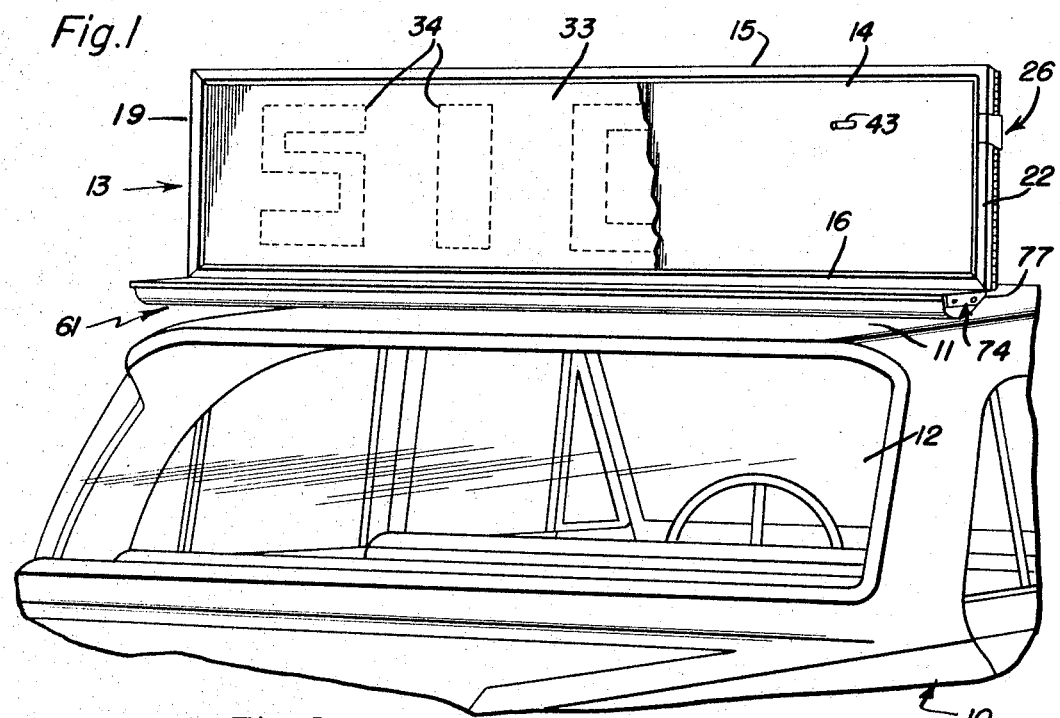

May 9, 1967 W. E. WHALEY ETAL 3,318,031
ADVERTISING SIGN FOR MOTOR VEHICLES
Filed Aug. 30, 1965 3 Sheets-Sheet 1

INVENTORS
William E. Whaley
William E. Whaley, Jr.
BY John A. Mawhinney
ATTORNEY

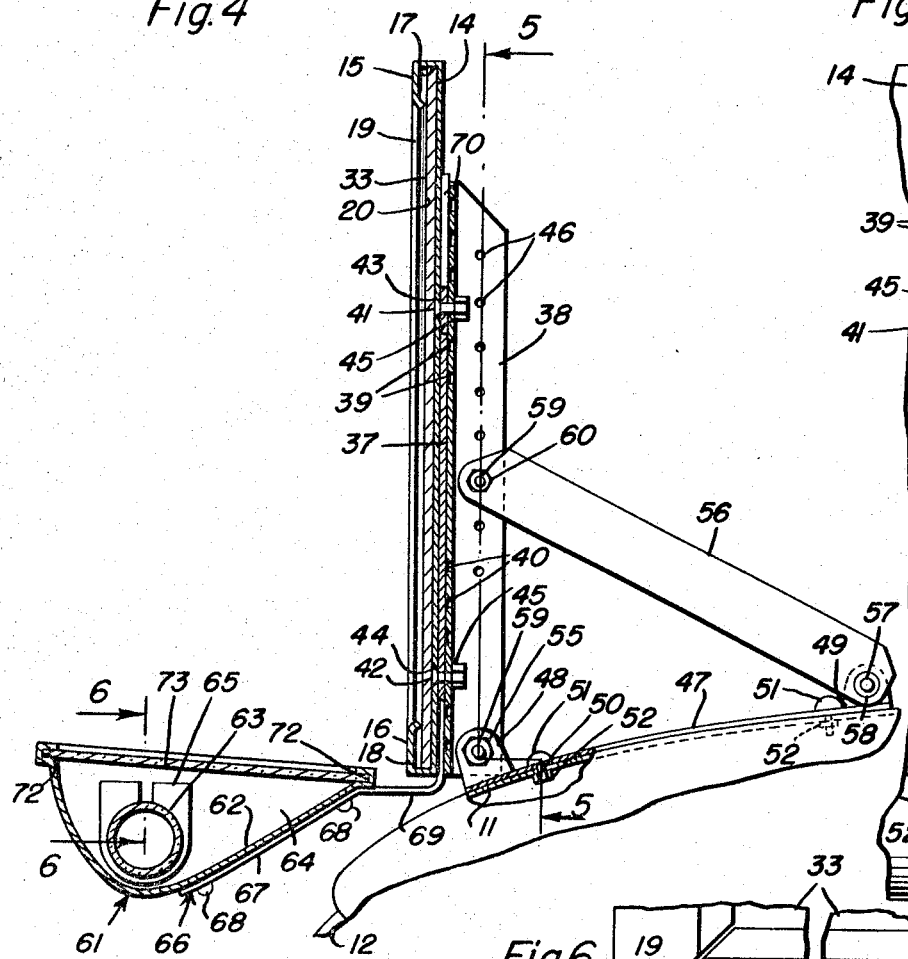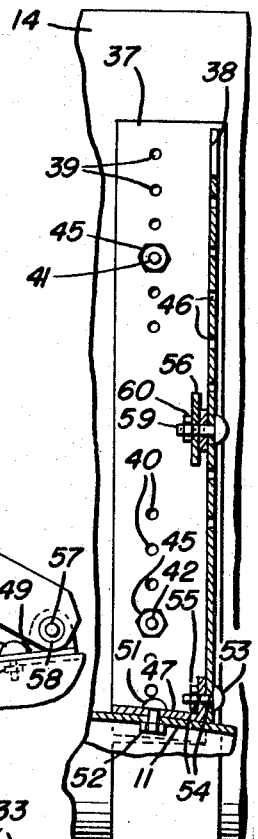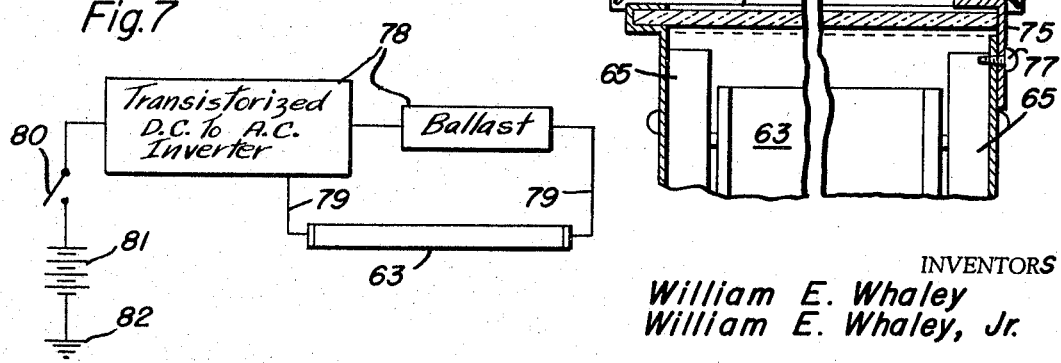

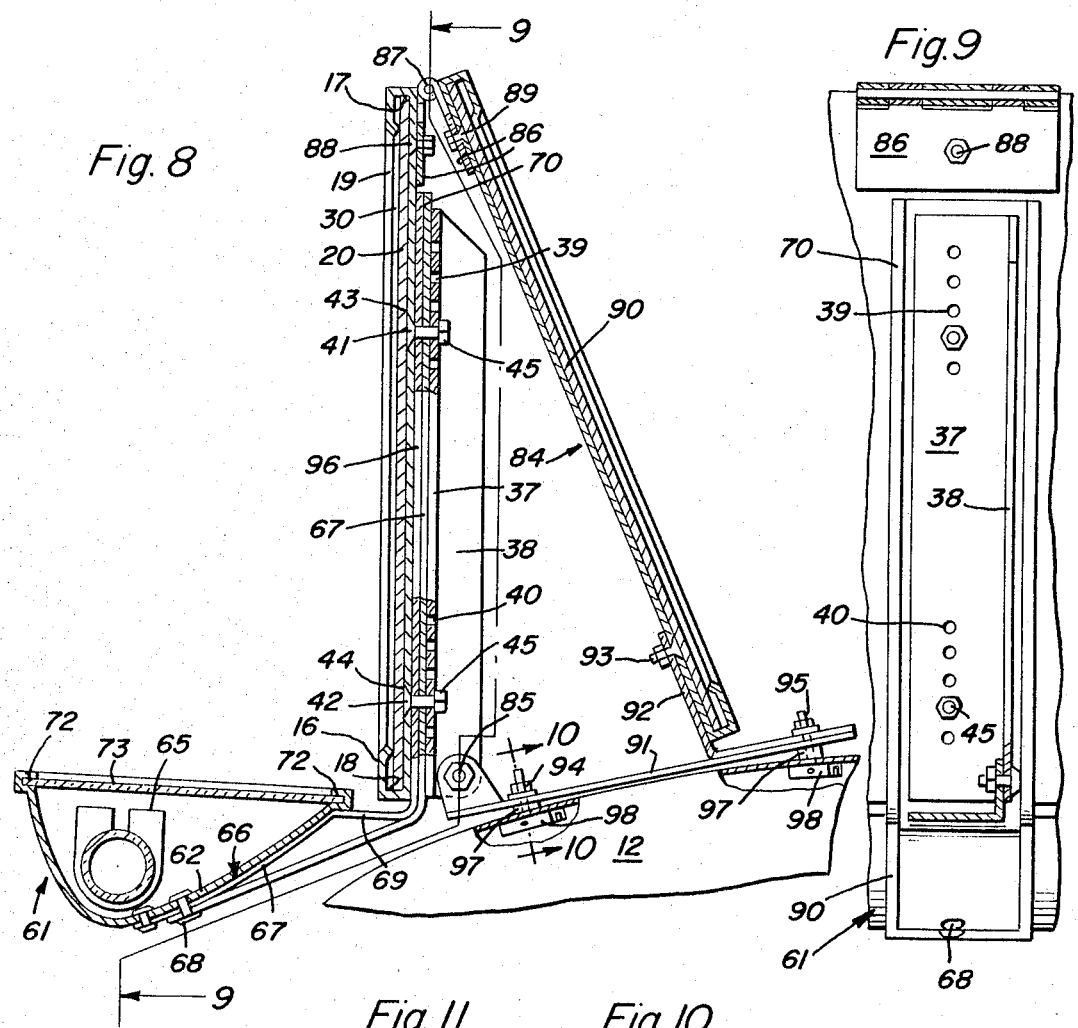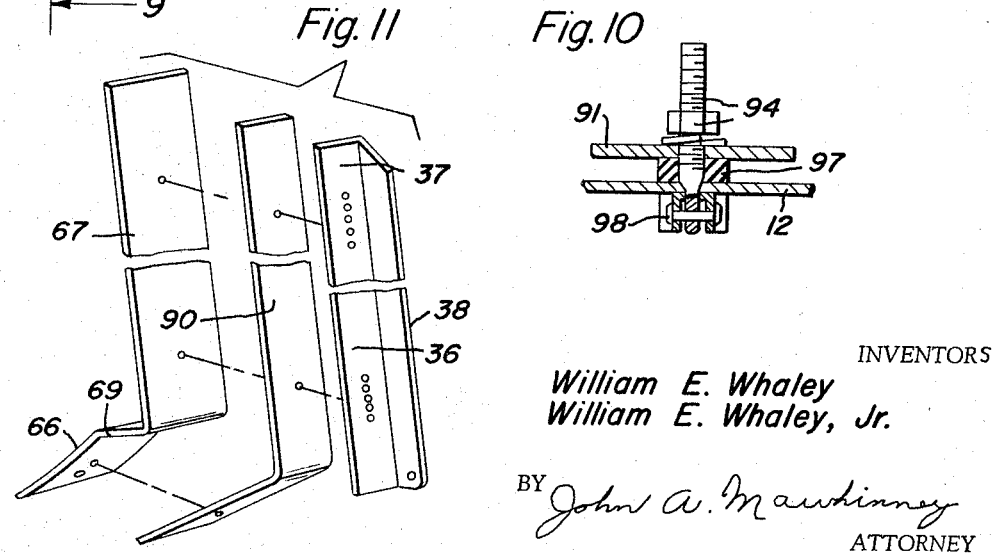

United States Patent Office 3,318,031
Patented May 9, 1967

3,318,031
ADVERTISING SIGN FOR MOTOR VEHICLES
William E. Whaley and William E. Whaley, Jr., Louisville, Ky., assignors to William E. Whaley Company, Louisville, Ky., a partnership
Filed Aug. 30, 1965, Ser. No. 487,102
16 Claims. (Cl. 40—129)

This application is a continuation-in-part of applicants' pending application Ser. No. 369,566, filed May 22, 1964, now abandoned, for improvements in an advertising sign for motor vehicles.

The present invention relates to an advertising sign structure adapted to be mounted on the roof of a motor vehicle or the like and is an improvement over the structures disclosed in U.S. Patents Nos. 2,496,763 and 2,812,605, granted Feb. 7, 1950 and Nov. 12, 1957, respectively, to William E. Whaley, one of the joint applicants of the present application.

The present invention contemplates the provision of a sign structure of this character which is a self-contained unit comprising a holder for a card having advertising material thereon, means for mounting the holder on the roof of the vehicle, a source of light, means for supporting the source of light from said holder so that it lights up the advertising material on the card carried by the holder, and means carried by said holder for activating said source of light and adapted to be connected to the battery of the vehicle to be energized thereby.

A further object of the present invention is to provide a device of this type in which the source of light is a conventional or standard fluorescent tube and the activating means comprises a transistorized D.C. to A.C. inverter and a ballast capable of stepping up the voltage of a substantially 12 volt battery initially to about 375 volts to start the fluorescent tube to burn and then operate the tube on about 65 volts.

The present invention also aims to provide a sign of this kind in which a portion of the advertising material is inscribed on the card with a fluorescent paint, or other conventional appropriate non-fluorescent paint, which is activated by fluorescent ultraviolet light, or fluorescent light, and the fluorescent tube is mounted in a housing having a transparent plastic cover characterized by the fact that it can permit a transmission of the ultraviolet light, or other light, from the fluorescent tube upon the advertising material on the card.

A still further aim of the present invention is to provide an advertising sign in which the mounting means for the holder which is adapted to conform to the longitudinal curvature of the roof and also to conform to the lateral curvature of the roof or equivalently clamp against the latter.

The present invention contemplates the provision of an advertising card holder which includes means for permitting the ready removal of one card and the substitution of another card therefor and yet will securely retain the card in proper poistion in the card holder, which means includes a hinge one leaf of which is an integral part of the card holder main body portion, a movable hinge member or leaf connected to the fixed leaf and a latching means for retaining the movable leaf in proper position to retain the card in the holder.

The present invention further contemplates means for mounting the advertising sign upon the roof of the vehicle so that it will not interfere with the vision of the operator of the vehicle in any direction and will not interfere with the normal or conventional operation of any part of the vehicle, such as, the opening and closing of the lid for the trunk compartment of the vehicle and free access to the trunk compartment as well as a gas tank and the fill pipe therefor.

Another object is to provide a second or modified form of the invention incorporating bracing means or a reinforcement for the card holder mentioned which also functions as a holder for another advertising card and thereby forms a second sign and is positioned at an angle to the first sign being connected to the latter at the top while spaced or separated therefrom at its base.

Still another object is to provide the second form of the invention with bracket or bar means to connect the two signs or card holders in divergent relation and in turn for detachable mounting thereof on the roof of an automotive vehicle.

One more object is to provide hinge means to connect the said two signs or card holders at their upper edges, pivotally connect one of the card holders to bracket or bar means, adjustably connect the other card holder in spaced or divergent relation to the bar or bracket means and adjustably and detachably secure the bracket or bar means to the roof of the automotive vehicle.

A remaining object is to provide in the second form of the invention a strip means which effectively braces and reinforces the card holder that carries the illuminating means in order to brace and reinforce the supporting bracket which attaches the illuminating means to that card holder.

With the foregoing and other objects in view, the invention will be more fully described hereinafter, and will be more particularly pointed out in the claims appended hereto.

Figure 2:
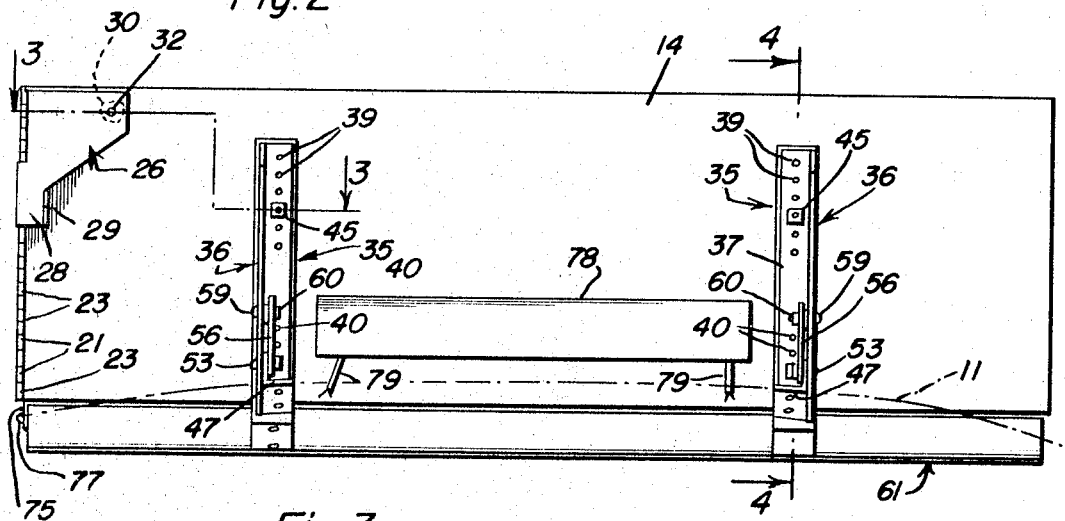
Figure 3:
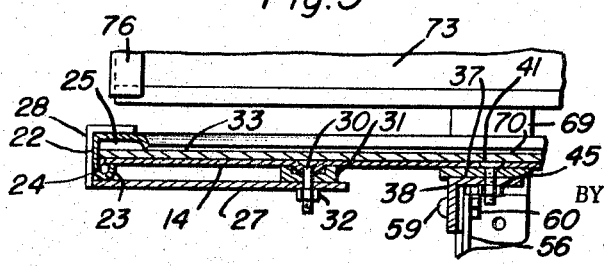

In the drawings, wherein like symbols refer to like or corresponding parts throughout the several views:

FIGURE 1 is a fragmentary rear perspective view of a motor vehicle with a sign constructed in accordance with one form of the present invention mounted on the roof with parts broken away, FIGURE 2 is a rear elevational view of the sign showing the motor vehicle in phantom lines, FIGURE 3 is a sectional view taken on the line 3—3 of FIGURE 2, FIGURE 4 is a vertical sectional view taken on the line 4—4 of FIGURE 2, FIGURE 5 is a vertical sectional view taken on the line 5—5 of FIGURE 4, FIGURE 6 is a sectional view taken on the line 6—6 of FIGURE 4, FIGURE 7 is a diagram of the electric circuit, FIGURE 8 is a vertical sectional view taken on the plane corresponding to that of FIGURE 4 but through a second or modified form of the invention, FIGURE 8 is a sectional view taken on the line 9—9 of FIGURE 8, FIGURE 10 is a sectional view taken on the line 10—10 of FIGURE 8, and FIGURE 11 is an exploded perspective view of the bracket and strip means which support the illuminating means.

Referring more particularly to the drawings, and first to the forms of FIGURES 1–7, 10 generally indicates a motor vehicle, such as a taxicab or the like, having a roof 11 and a rear window 12. The sign of the present invention, which is indicated generally at 13, is adapted to be mounted on the roof 11 of the vehicle adjacent to but forwardly of the rear window 12.

The sign 13 includes a card holder comprising a substantially flat elongated rectangular main body part 14, the peripheral edge portions of the top and bottom sides of which are turned in upon themselves as indicated at 15 and 16 by a stamping or like operation to form longitudinally extending guide ways 17 and 18 of channel cross-section integral with the main body part 14. One free end portion of the main body part is bent upon itself as indicated at 19 to form a transversely extending recess and to close one end of the guide ways 17 and 18. This end recess is indicated at 20.

The opposite end portion of the main body part 14 is in the form of a hinge the fixed leaf of which comprises a plurality of spaced apart knuckles 21 which are formed by cutting away spaced apart free end portions of the body part 14 and rolling upon themselves the remaining spaced apart free end portions of the said other end of the body part 14.

The movable leaf of the hinge comprises a strip 22 of substantially channel-shape in cross section having a plurality of spaced apart knuckles 23 formed along one free edge thereof which are received by the spaces between the knuckles 21 on the fixed leaf of the hinge. A hinge pin or pintle 24 extends through the aligned openings in the knuckles 21 and 23.

When in its closed position the movable leaf 22 of the hinge closes the adjacent ends of the guide ways 17 and 18 and provides a recess 25 similar to the recess 20 formed in the opposite end of the body part 14. For retaining the movable leaf in its closed position against accidental movement therefrom there is provided a latching means generally indicated at 26. The latching means comprises a lever member 27 pivotally mounted to the main body part 14 of the card holder adjacent to one end of the lever member 27 which carries or has formed integrally therewith a substantial U-shaped part 28 which is adapted to overlie the hinge when in its closed position with one leg of the U-shaped part 28 engaging the fixed leaf of the hinge and the other leg of the part 28 engaging the movable leaf of the hinge to set up frictional engagement between the legs of the U-shaped part 28 and the leaves of the hinge. The lever 27 is also provided with a hand or finger gripping portion 29 by means of which the lever 27 can be easily swung from its operative latching position to its inoperative position. The lever member 27 is pivotally mounted on the main body part 14 by means of a bolt 30 extending through suitably aligned openings in the part 14, the lever member 27 and the spacer 31 and is held in position by a nut 32 received on the outer screw threaded portion of the bolt 30. It will be noted particularly from FIGURE 3 of the drawings that the head of the bolt 30 is received by a countersink formed in the body part 14 so that the head of the bolt will not present any obstruction to the movement of an advertising card into and out of the card holder.

FIGURES 1, 3 and 4 of the drawings illustrate an advertising card 33 removably mounted in the card holder. Each card 33 may be made from any suitable material such as paper board of the conventional and well-known type. The advertising material indicated at 34 is imprinted upon the outer face of the card 33 with any conventional fluorescent or non-fluorescent paint which is capable of being activated by a fluorescent ultraviolet bulb, or by a conventional non-fluorescent lamp, such as, the General Electric F40 BL which is known as black light manufactured by the General Electric Co. This bulb is characterized by a relatively high concentration of ultraviolet light and relatively less visible light.

Each card 33 is substantially of the same size and shape as the main body part 14 of the card holder and when the hinge at one end of the card holder is in its open position a card 33 may be readily inserted into the holder by entering the top and bottom peripheral edge portions of the card 33 into the guide ways 17 and 18 and pushing the card inwardly of the card holder until the leading end portion thereof is received by the recess 20 of the card holder. The movable leaf 22 of the hinge is now swung to its closed position and the latching means 26 is then swung to its operative position shown in FIGURES 2 and 3 of the drawings so that the card will be securely held in the holder. When it is desired to remove the card 33 from the holder and substitute therefor another card containing different advertising material the latching means 26 is swung to its inoperative position and the movable leaf 22 of the hinge is swung outwardly and rearwardly so that its recess 25 is withdrawn from the adjacent end portion of the card and the card may be readily removed or withdrawn from the card holder.

The advertising material 34 may be imprinted on the advertising card 33 by a fluorescent or a conventional non-fluorescent paint having different color pigments so that the letters or characters of the advertising material may present different colors to the eye of the observer along the lines of U.S. Patent No. 2,652,650, granted Sept. 22, 1953 to Helms et al.

Means are provided for detachably mounting the card holder 14 to the roof of a vehicle and supporting the card holder thereon. Said means comprises a pair of brackets generally indicated at 35 as can be seen from FIGURE 2 of the drawing. The structure of the brackets 35 is the same except that one is a right-hand bracket and the other is a left-hand bracket. Each bracket comprises an elongated substantially L-shaped in cross section first part 36. One leg 37 of the first bracket part 36 has a width substantially twice that of the width of its other leg 38. The leg 37 of the first bracket part 36 is secured to the rear face of the main body part 14 of the card holder and for this purpose two series of openings 39 and 40 are provided in the leg 37 adjacent the upper and lower ends thereof, respectively. Fastening elements 41 and 42 which may be in the form of bolts extend through a suitable opening 43 formed in the upper portion of the main body part 14 of the holder and another suitable opening 44 formed in the lower end portion of the main body part 14 of the card holder extend through the selected openings 39 and 40. The bolts 41 and 42 are held in position by means of nuts 45. In order to provide for angular movement as well as vertical movement of the first bracket part 36 the upper opening 43 in the main body part 14 of the card holder is in the form of an elongated slot.

The narrow leg 38 of the first bracket part 36 extends rearwardly from the rear face of the main body part 14 of the card holder and is provided with a series of vertically spaced apart openings 46 for a purpose later to be described.

Each bracket 35 comprises a second bracket part 47 which is of elongated form and being curved longitudinally and curved or twisted transversely as is apparent from an inspection of FIGURES 4 and 5 of the drawing. The second bracket part 47 is provided with an upstanding lug or ear 48 adjacent its inner end portion and is also provided with a lug or ear 49 adjacent the other end portion thereof. The second bracket part 47 is provided with an aperture 50 adjacent to each of the lugs 48 and 49 for the reception of a bolt or the like 51 which extends through appropriate aligned openings in the roof 11 of the vehicle and which are secured in place by nuts 52.

The inner lug 48 is secured to the lower portion of the narrow leg 38 of the first bracket part 36 by a bolt or the like 53 which extends through appropriate aligned openings 54 formed in the lower portion of the narrow leg 38 of the first bracket part 36 and is secured in place by nut 55.

The lug 49 of the second bracket part 47 is secured to the outer end portion of a link 56 by means of a suitable fastening means which might be in the form of a bolt 57 and a nut 58, the bolt 57 passing through suitably aligned apertures in the lug 49 and the link 56. The link 56 is adjustably and selectively attached to the narrow leg 38 of the first bracket part 36 by means of a bolt 59 which extends through a suitable aperture in the link 56 and one of the openings 46 formed in the narrow leg 38. The bolt 59 is held in its selected position by a nut 60. It will be noted that the narrow leg 38 of the first bracket part 36, the lugs 48 and 49 and the link 56 are of substantially the same thickness and that the inner portion of the link 56 and the lug 48 are secured against the inner face of the narrow leg 38 and the lug 49 overlies the outer surface of the link 56. With this arrangement the thrust of the link 56 will take place in one vertical plane and there will be no torque or twisting movement imparted to the various parts and their fastening elements which are involved.

The means for illuminating the advertising material 34 on the advertising card 33 is indicated generally at 61 and includes a substantially parabolic reflector 62 which constitutes a housing for either a conventional fluorescent lamp or a fluorescent ultraviolet lamp characterized by a relatively high concentration of ultraviolet light and relatively less visible light. The latter is a conventional type of lamp, for example the "black light" manufactured by General Electric Co. and known as the General Electric F40 BL. The fluorescent light or lamp is indicated at 63 and the lamp or tube is supported in the end wall 64 of the reflector 62 in the conventional manner by the supports 65 having the usual electrical contacts.

The reflector 62 is supported from the main body part 14 of the card holder by a bracket 66 which comprises a substantially straight flat portion 67 which is secured to the outer surface of the reflector 62 by fastening elements 68 which may be in the form of screws or bolts extending through suitable openings in the flat portion 67 and received by screw-threaded sockets in the reflector 62. The upper inner end part of the flat portion 67 merges into a portion 69 which is bent at substantially a 45 degree angle to the flat portion 67 and this portion 69 forms the intermediate portion of the bracket 66. At its end remote from the flat portion 67 the bracket 66 is bent upwardly at substantially right angles to the portion 69 and has a length substantially the same as the length of the wide leg 37 of the first bracket part 36. This elongated portion is indicated at 70 in FIGURE 4 of the drawings and lies between the main body part 14 of the card holder and the wide leg 37 of the first bracket part 36 in which position it is secured by the fastening elements 41 and 42 which hold the first bracket part 36 fixed to the main body part 14 of the card holder.

A pair of brackets 66 are provided for the proper support of the reflector 62. The reflector 62 may be formed by a conventional extrusion process which simultaneously forms the longitudinally extending grooves 72 and the parabolic shape of the reflector. A transparent plastic cover is removably received by the grooves 72 as indicated at 73 in FIGURE 4 of the drawings. The plastic cover 73 is characterized by the fact that it permits the transmission of the ultraviolet or other light from the fluorescent tube 63. The plastic cover 73 is removably retained in the groove 72 by a pair of keepers one of which is indicated generally at 74 in FIGURE 1 of the drawings. Each keeper 74 is of substantially L-shape in cross section and comprises a vertical leg 75 and a horizontal leg 76. The vertical leg 75 is provided with two openings which register with two screw-threaded openings in the end wall 64 of the reflector 62 for the reception of screws 77 or the like for retaining the keepers 74 in their operative positions. The keepers overlie the opposite free ends of the plastic cover 73 to prevent longitudinal movement of the cover in the groove 72.

It will be noted particularly from FIGURE 4 of the drawings that the brackets 66 hold the reflector 62 and the plastic cover 73 at slightly less than a right angle to the main body part 14 of the card holder so that the light emanating from the fluorescent lamp 63 is directed upon the entire surface area of the part 14, that is, against the advertising material on the advertising card 33 so as to insure the proper illumination of the entire advertising material 14.

A conventional transistorized D.C. to A.C. inverter and ballast device 78 is secured to the rear face of the main body part 14 of the card holder by any suitable means such as by bolts and nuts of by welding between the pair of brackets 35. The device 78 is electrically connected to the opposite ends of the fluorescent tube 63 by electrical connections 79. The device 78 may be made as illustrated in Catalog No. 400–101 of the Jefferson Electric Company of Bellwood, Ill., or it may be made in accordance with U.S. Patent No. 2,982,881 granted May 2, 1961, to Robert W. Reich, particularly FIGURE 1 of the drawing of this patent, or in accordance with U.S. Patent No. 2,964,676, granted Dec. 13, 1960, to Ian F. Davies et al. The electrical circuit is shown diagrammatically in FIGURE 7 of the drawing in which the device 78 is shown as electrically connected at one end through a manually operated switch 80 to a 12 volt D.C. battery 81 of a motor vehicle such as a taxicab, the ground for which is shown at 82. One of the electrical connections 79 connects the inverter with the ballast and then connects the ballast with one end of the fluorescent tube 63, and the other electrical connection 79 connects the inverter with the other end of the tube 63.

The purpose of the device 78 is to convert the D.C. current of the D.C. battery 81 to A.C. current and to step up the voltage of the 12 volt battery 81 to a sufficiently high voltage to start the fluorescent tube 63 burning, for example, to step the voltage up to about 375 to 400 volts and then to operate the lamp on about 65 volts.

The sign 13 is adapted to be mounted upon the roof 11 of a vehicle 10 adjacent to the rear window 12 of the vehicle but care should be exercised that the sign will not interfere with vision through the rear window 12. For this purpose the vertical height of the sign above the roof is controlled by the selection of the proper openings 39 and 40 of the wide leg 37 of the first bracket part 36, in which to secure the fastening elements 41 and 42. In securing the second bracket part 47 to the roof 11 of the vehicle both the longitudinal and transverse curvature of the roof must be taken into consideration so that when the second bracket part 47 is secured to the roof its entire under surface area will engage the roof 11. This is the reason that a longitudinal curvature and a transverse curvature or twist is given to the second bracket part 47 so that it can accommodate itself to the two curvatures of the roof and also adapt itself to roofs having different curvatures.

Appropriate openings are then made through the roof 11 at the proper locations for the reception of the bolts 51 and nuts 52. It is preferable to have the main body part 14 of the card holder disposed in a substantially vertical plane and in order to accomplish this result despite the location of the second bracket part 47 on the roof 11 the links 56 are provided. A part 14 and the brackets 35 can be swung about the bolts 53 as a pivot to position the part 14 in the desired substantially vertical plane. The links 56 can then be swung about the bolts 57 as a pivot until the opening in the inner end of each link 56 is brought into alignment with the proper opening 46 in the leg 38 of the first bracket part 36. The links will then be secured in this properly adjusted position by the bolts 59 and nuts 60.

If it is necessary or desirable to augment the transverse curvature or twist of the second bracket part 47 the upper fastening element 41 can be loosened and the bracket members 35 swung about the lower fastening elements 42 as a pivot. This movement is permitted by virtue of the upper opening 43 formed in the main body part 14 of the card holder. After the proper adjustment has been made the fastening element 41 is again tightened and the bolts 51 and nuts 52 which have been loosened to permit the adjustment are again tightened.

In order to illuminate the advertising material on the card 33 the switch 80 will be closed so that the device 78 is energized which in turn will energize the tube 63.

It is obvious that various other changes and modifications may be made in the details of construction and design of the above specifically described embodiment of this invention without departing from the spirit thereof, such changes and modifications being restricted only by the scope of the following claims.

For instance, we may employ the second or modified form of the invention illustrated in FIGURES 8 to 11, inclusive. Upon reference to such figures, it will be seen that we may employ all of the parts of FIGURES 1 through 4, with the exception of the specific link 56, second bracket part 47 and the associated fastenings such as elements 51, 52, 55, 57, 59 and 60. The sign holder 14 is vertically positioned as in the first form of the invention, and all applicable reference numerals used in that first form have been applied to the same parts employed in the second or modified form.

Additional to the sign holder 14, an element 84 is provided to reinforce or brace it and also to constitute a second card holder. Such card holder 84, which may be of the same construction as card holder 14 of the first form, diverges downwardly with relation thereto in that it is connected with the top or upper edge portion of that holder 14 by hinge means such as leaves 86 joined by pintles 87 and bolted or otherwise secured at 88 and 89, one to card holder 14 and one to card holder 84.

Card holder 84 is shown as identical with card holder 14, and is disposed forwardly thereof, that is, between the same and the front of the vehicle, at a downwardly and forward angle or slant so that the pair of card holders will be separated at their bases, and the card holder 84 provides the maximum strut effect for the card holder 14 for wind-resisting and reinforcing purposes.

The open or card-exhibiting face of card holder 84, it will be noticed, is reversed front to back with respect to the similar face of associated card holder 14.

In this second form of the invention an advertising card 90 is removably mounted in holder 84, secured by latch means such as 26 of the first form and which card 90 may, although it need not, be like that at 33 in the first form of the invention. The cards 33 and 90 may be interchangeable in the card holders 14 and 84 and, in fact, form cards of a series of any desired number, any one of which may be exhibited selectively in either card holder 14 or 84.

It is particularly to be noted that, for example, the advertising material on card 90 may be imprinted with fluorescent paint or any other conventional appropriate non-fluorescent paint having different colored pigments so that the letters, characters or design of the advertising or equivalent material may present to the eye of the observer different colors or variations of the colors in the different cards or different portions of any of the cards along the lines of the disclosures in U.S. Patent No. 2,652,650, granted Sept. 22, 1953, to Helms et al.

In the second form of the invention, sign 14 at bracket parts 37, is bolted or pivotally connected at 85 to generally horizontal attaching bars 91 while angle brackets 92 are bolted at 93 to card holder 84. Suitable bolts or fastenings 94 and 95 removably secured the attaching bars 91 to the top of the vehicle 12, it being noted that the fastenings 95 also additionally and adjustably secure the angle brackets 92 to the attaching bars 91.

Reverting to the card holder 14 as used in the second form, strips or bars 96 also reinforce and stiffen the sign 13 generally, and the illuminating means 61 in particular, the same being clamped for the most part between and contacting bracket parts 37 and 67 and fastened in place by the elements 41 and 42. Below card holder 14 the strips or bars 96 contact the bracket portions 66 at separated points and are secured to the illuminating means by the fastenings 68 which also secure bracket portions 66 thereto. As a result, vibration of the illuminating means is greatly minimized incident to travel of the vehicle mounting the invention over rough roadway. Note that bolts or fastenings 94 and 95 pass through rubber washers 97 interposed between bars 91 and top 11 and that such bolts have pivoted heads 98 to facilitate adaption to the shape of the roof 12.

Emphasis is laid on the fact that we have devised an exceedingly well reinforced structure generally and with respect to the illuminating means carried thereby, at the same time maintaining the cost of production, installation and upkeep at a minimum.

Further, the specific advertising cards 33 and 90 may be readily interchanged from one sign holder to the other to provide different signs, one of the cards, if desired, being more suitable for day exhibition than for night exhibition, or one of the cards being more suitable for a special event or events than the other card. In fact, the advertising cards 33 and 90 may be ones of a set of any desired number of cards each containing different advertising matter, so that frequent interchanging of the advertising cards is permissible, which is very desirable in connection with a taxicab or hired vehicle where different advertising or equivalent cards are used for various special occasions, and the same are exhibited for different lengths of time consistant with the rental system of exhibition of the cards.

What is claimed is:

1. An advertising sign adapted to be mounted on the roof of a motor vehicle having a battery comprising a holder for a card having advertising material thereon and including means for mounting the holder on the roof of the vehicle, a source of light, means carried by said source of light independent of and separable from said holder for supporting the source of light from said holder so that it lights up the advertising material on the card carried by the holder, and means carried by said holder for activating said source of light and adapted to be connected to the battery of the vehicle to be energized thereby.

2. An advertising sign adapted to be mounted on the roof of a motor vehicle having a battery comprising a holder for a card having advertising material thereon, means for mounting the holder on the roof of the vehicle, a source of light means for supporting the source of light from said holder so that it lights up the advertising material on the card carried by the holder, means carried by said holder for activating said source of light and adapted to be connected to the battery of a vehicle to be energized thereby, said card holder being adapted to support the card in a substantially vertical plane, a housing for the source of light comprising a closed bottom, closed side walls and an open top disposed in a plane at an angle materially less than a right angle to the vertical plane of the card so that the light from the source of light is emitted through the open top of the housing upon the entire suface of the card.

3. An advertising sign as claimed in claim 2 wherein the free end portions of the side walls of the housing extend outwardly, then upwardly and then inwardly in spaced relation to the outwardly extending parts to provide longitudinally extending grooves, a transparent plastic cover for the open top of the housing is removably received by said grooves, said plastic cover is characterized by the fact that it can permit the transmission of the light from the fluorescent tube, the advertising material on the card is inscribed thereon with a paint which is activated by fluorescent light, and means is provided for removably retaining the cover in position within said grooves.

4. An advertising sign adapted to be mounted on the roof of a motor vehicle having a battery comprising a holder for a card having advertising material thereon, means for mounting the holder on the roof of the vehicle, a source of light, means for supporting the source of light from said holder so that it lights up the advertising material on the card carried by the holder, means carried by said holder for activating said source of light and adapted to be connected to the battery of the vehicle to be energized thereby, said means for mounting the holder on the roof of the vehicle comprising a bracket having a first part attached to said holder and a second part attached to the first part and adapted to be attached to the roof of the vehicle, said second part being curved longitudinally to conform to the longitudinal curvature of the roof and also being transversely curved to conform to the lateral curvature of the roof, means including an enlongated slot in the holder and a fastening element carried by said first bracket part riding in said slot to effect angular adjustments of said first bracket part in a vertical plane and adjustment of said second bracket part in a substantially horizontal plane.

5. An advertising sign as claimed in claim 4, wherein said first bracket part has a vertically extending flange provided with a series of vertically spaced apart openings, said second bracket part is pivotally connected to the lower end portion of said first part at the inner end portion of the second part, a link is pivotally attached at its outer end to the outer end portion of said second part, and cooperating means are provided for selectively attaching the inner end of the link to the first bracket part at a selected opening therein so that the second bracket part is adjusted to conform further to curvatures of roofs of different vehicles.

6. An advertising sign as claimed in claim 1, wherein said mounting means for the holder comprises a bracket, said supporting means for the light source comprises a second bracket, and common means are provided for securing both brackets to said holder.

7. An advertising sign adapted to be mounted on the roof of a motor vehicle having a battery comprising a holder for a card having advertising material thereon, means for mounting the holder on the roof of the vehicle, a source of light, means for supporting the source of light from said holder so that it lights up the advertising material on the card carried by the holder, means carried by said holder for activating said source of light and adapted to be connected to the battery of the vehicle to be energized thereby, said holder comprising a substantially flat main body part the free end portions of the opposite sides of which are bent upon themselves to provide longitudinal extending guideways to receive slidably and removably the opposite side portions of the advertising card, the free end portion of one end of the main body part being bent upon itself to close one end of the guideways and to provide a transversely extending recess to receive one end portion of the advertising card, the other end portion of the main body part having a hinge one leaf of which comprises a plurality of spaced apart knuckles on the free end portion of said other end, and the other leaf of the hinge having a plurality of spaced apart knuckles which are staggered with relation to the knuckles of the said one leaf so that the knuckles of the two leaves are received by the spacers between the knuckles of the leaves, a pintle extending through the knuckles of the two leaves, the said other leaf having a recess therein corresponding to the recess of the said one end portion of the main body part to receive the other end portion of the advertising card to prevent its escape from the holder and adapted to be moved away from the card to permit removal of the card, and latching means independent of the hinge for frictionally engaging the recessed leaf when in its card retaining position for holding the hinge in its card retaining position comprising a lever member pivotally mounted on the holder, a hinge engaging portion and a finger engaging portion.

8. For use with an advertising placard holder adapted to be mounted on the roof of a motor vehicle, means cooperating with such roof and forming a connection between the holder and the roof comprising a pair of brackets each of which includes a first part adapted to be secured to the holder and a second part adapted to be secured to the roof, said second part being curved longitudinally to conform to the longitudinal curvature of the roof and also curved transversely to conform to the lateral curvature of the roof.

9. Cooperating means as claimed in claim 8, wherein said first and second parts are provided with cooperating means for selectively adjustably connecting the second part to the first part to supplement the conformance of the second part to the roofs of various curvatures.

10. For use with an advertising placard holder adapted to removably retain a placard and having two closed sides and one closed end, hinge means cooperating with the open end of the holder to retain the placard removably on the holder comprising a hinge having two leaves hingedly connected one of which is formed integral with the holder and the other leaf of which in one position is adapted to constitute a closure for the open end of the holder and in a second position is moved away from the placard to permit withdrawal of the placard from the holder, and latching means independent of the hinge for frictionally engaging said other leaf when said other leaf is in its placard retaining position for retaining said other leaf in the said one position, said latching means comprising a lever member pivotally mounted on the placard holder having a U-shaped part adapted to overlie the hinge when in its closed position with one leg of the U-shaped part engaging the fixed leaf of the hinge and the other leg engaging the movable leaf of the hinge to set up frictional engagement between said legs and the leaves of the hinge, said lever member adapted to be swung on its pivot to an unlatching position out of the path in both directions of movement of the movable leaf of the hinge.

11. An advertising structure having sign holders connected together in downwardly diverging relation, means to secure said holders together adjacent their bases, means to secure the first mentioned means to the top of a vehicle, and illuminating means for one of said holders carried by the base of that holder.

12. An advertising sign adapted to be mounted on the roof of a motor vehicle having a battery comprising a holder for a card having advertising material thereon and including means for mounting the holder on the roof of the vehicle, a source of light, means for supporting the source of light from said holder so that it lights up the advertising material on the card carried by the holder, means carried by said holder for activating said source of light and adapted to be connected to the battery of the vehicle to be energized thereby, a second holder for an advertising card diverging downwardly from the upper edge of the first-mentioned card holder.

13. An advertising sign adapted to be mounted on the roof of a motor vehicle having a battery comprising a holder for a card having advertising material thereon, means for mounting the holder on the roof of the vehicle, a source of light, means for supporting the source of light from said holder so that it lights up the advertising material on the card carried by the holder, means carried by said holder for activating said source of light and adapted to be connected to the battery of the vehicle to be energized thereby, a second sign holder for an advertising card extending downwardly from the upper edge of the first-mentioned card holder, and bar means securing the bases of the card holders together in separated relation, said bar means extending below said source of light for attachment to the roof of a vehicle with said source of light spaced from that roof to minimize vibration.

14. An advertising sign adapted to be mounted on the roof of a motor vehicle having a battery comprising a holder for a card having advertising material thereon, means for mounting the holder on the roof of the vehicle, a source of light, means for supporting the source of light from said holder so that it lights up the advertising material on the card carried by the holder, means carried by said holder for activating said source of light and adapted to be connected to the battery of the vehicle to be energized thereby, and strip means reinforcing said card holder and below the latter engaging said source of light supporting means at spaced locations to reinforce said source of light supporting means.

15. An advertising sign as claimed in claim 1, wherein a second card holder extends downwardly from and in diverging relation to the first mentioned card holder.

16. An advertising sign adapted to be mounted on the roof of a motor vehicle having a battery comprising a first holder for a card having advertising material thereon, means for mounting the holder on the roof of the vehicle, a source of light, means for supporting the source of light from said holder so that it lights up the advertising material on the card carried by the holder, means carried by the said holder for activating said source of light and adapted to be connected to the battery of the vehicle to be energized thereby, a second sign holder for an advertising card extending downwardly from the upper edge of the first card holder, bar means securing the bases of the card holders together in separated relation, said bar means extending below said source of light for attachment to the roof of a vehicle with said source of light spaced from that roof to minimize vibration, means to adjustably secure the first card holder to said bar means, an angle bracket secured to the second card holder, and means to secure said bar means to a vehicle roof also functioning to secure said angle bracket to said bar means.

References Cited by the Examiner

UNITED STATES PATENTS

| | | | |
|---|---|---|---|
| 549,630 | 11/1895 | Cole | 40—125 |
| 717,758 | 1/1903 | McMullin | 240—7.1 |
| 1,432,843 | 10/1922 | Dooley | 232—21 |
| 1,532,091 | 3/1925 | Collins | 240—7.1 |
| 1,674,264 | 6/1928 | Prather | 40—125 X |
| 1,883,681 | 10/1932 | Gage | 240—7.1 |
| 1,997,239 | 4/1935 | Shea | 16—146 X |
| 2,158,195 | 5/1939 | Mutti | 40—129 |
| 2,262,157 | 11/1941 | Beals | 240—7.1 |
| 2,281,343 | 4/1942 | Walker | 40—130 |
| 2,291,777 | 8/1942 | Wahlberg | 40—204 |
| 2,613,465 | 10/1952 | View | 40—130 |
| 2,620,579 | 12/1952 | Dienes | 40—129 |
| 2,626,473 | 1/1953 | Howenstine | 40—125 |
| 2,652,650 | 9/1953 | Helms et al. | 40—129 |
| 2,748,255 | 5/1956 | Decker | 240—7.1 |
| 2,942,367 | 6/1960 | Lee et al. | 40—129 |
| 2,961,786 | 11/1960 | Lowmaster | 40—125 |
| 2,964,676 | 12/1960 | Davies et al. | 315—98 |
| 2,982,881 | 5/1961 | Reich | 315—205 |
| 3,108,803 | 10/1963 | Naideth | 248—237 |

EUGENE R. CAPOZIO, *Primary Examiner.*

JEROME SCHNALL, *Examiner.*

S. M. BENDER, R. WEIG, *Assistant Examiners.*